United States Patent
Sampica et al.

(10) Patent No.: US 8,691,043 B2
(45) Date of Patent: Apr. 8, 2014

(54) SUBSTRATE LAMINATION SYSTEM AND METHOD

(75) Inventors: James D. Sampica, Springville, IA (US); Paul R. Nemeth, Cedar Rapids, IA (US); Tracy J. Barnidge, Marion, IA (US); Vincent P. Marzen, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1386 days.

(21) Appl. No.: 12/009,375

(22) Filed: Jan. 18, 2008

(65) Prior Publication Data

US 2009/0120572 A1    May 14, 2009

Related U.S. Application Data

(63) Continuation-in-part of application No. 11/214,518, filed on Aug. 30, 2005, now Pat. No. 7,566,254, and a continuation of application No. 11/215,683, filed on Aug. 30, 2005, now Pat. No. 7,435,311.

(51) Int. Cl.
*B32B 37/00*    (2006.01)

(52) U.S. Cl.
USPC ............................... 156/286; 156/285

(58) Field of Classification Search
USPC ............... 156/285, 286, 104, 106, 382
See application file for complete search history.

(56) References Cited

U.S. PATENT DOCUMENTS

| | | |
|---|---|---|
| 3,089,801 A | 5/1963 | Tierney et al. |
| 3,616,197 A | 10/1971 | Amberg et al. |
| 3,851,758 A | 12/1974 | Makhijani et al. |
| 4,078,962 A | 3/1978 | Krueger |
| 4,188,254 A | 2/1980 | Hemperly, Jr. |
| 4,235,951 A | 11/1980 | Swarovski |
| 4,737,182 A | 4/1988 | Fecik et al. |

(Continued)

FOREIGN PATENT DOCUMENTS

| | | |
|---|---|---|
| EP | 0556351 B1 | 8/1993 |
| EP | 0 711 103 | 5/1996 |

(Continued)

OTHER PUBLICATIONS

Machine Trnaslation of JP 2006-290960, date unknown.*

(Continued)

*Primary Examiner* — Jeff Aftergut
(74) *Attorney, Agent, or Firm* — Donna P. Suchy; Daniel M. Barbieri

(57) ABSTRACT

The present disclosure is directed to a substrate lamination system and method. A method for laminating substrates may comprise: (a) disposing a pressure-sensitive adhesive later between a substantially planar surface of a first substrate and a substantially planar surface of a second substrate; (b) disposing the first substrate, pressure-sensitive adhesive layer and second substrate within a vacuum chamber; (c) evacuating the vacuum chamber; (d) applying pressure to at least one of the first substrate and the second substrate. A system for laminating substrates may comprise: (a) means for disposing a pressure-sensitive adhesive layer between a substantially planar surface of a first substrate and a substantially planar surface of a second substrate; (b) means for disposing the first substrate, pressure-sensitive adhesive layer and second substrate within a vacuum chamber; (c) means for evacuating the vacuum chamber; (d) means for applying pressure to at least one of the first and second substrates.

26 Claims, 18 Drawing Sheets

(56) References Cited

U.S. PATENT DOCUMENTS

| | | | |
|---|---|---|---|
| 4,747,577 A | 5/1988 | Dimock | |
| 4,756,735 A | 7/1988 | Cathers et al. | |
| 5,108,532 A | 4/1992 | Thein et al. | |
| 5,566,840 A | 10/1996 | Waldner et al. | |
| 5,592,288 A * | 1/1997 | Sampica et al. | 356/62 |
| 5,678,303 A | 10/1997 | Wichmann | |
| 5,918,517 A | 7/1999 | Malapert et al. | |
| 5,950,512 A | 9/1999 | Fields | |
| 5,959,762 A | 9/1999 | Bandettini et al. | |
| 6,128,066 A | 10/2000 | Yokozeki | |
| 6,366,013 B1 | 4/2002 | Leenders et al. | |
| 6,388,724 B1 | 5/2002 | Campbell et al. | |
| 6,481,482 B1 | 11/2002 | Shimotomai | |
| 6,614,057 B2 | 9/2003 | Silvernail et al. | |
| 6,681,668 B1 | 1/2004 | Smirle | |
| 6,803,245 B2 | 10/2004 | Auch et al. | |
| 6,832,538 B1 | 12/2004 | Hwang | |
| 6,842,288 B1 | 1/2005 | Liu et al. | |
| 6,984,545 B2 | 1/2006 | Grigg et al. | |
| 6,998,648 B2 | 2/2006 | Silvernail | |
| 7,273,403 B2 | 9/2007 | Yokota et al. | |
| 7,349,154 B2 | 3/2008 | Aiura et al. | |
| 7,381,110 B1 | 6/2008 | Sampica et al. | |
| 7,435,311 B1 * | 10/2008 | Marzen et al. | 156/286 |
| 7,452,258 B1 | 11/2008 | Marzen et al. | |
| 7,814,676 B2 | 10/2010 | Sampica et al. | |
| 7,927,440 B2 | 4/2011 | Matsuhira | |
| 7,929,086 B2 | 4/2011 | Toyama et al. | |
| 8,038,498 B2 | 10/2011 | Miyauchi et al. | |
| 8,137,498 B2 | 3/2012 | Sampica et al. | |
| 2001/0053648 A1 | 12/2001 | Furukawa et al. | |
| 2002/0186343 A1 | 12/2002 | Liao et al. | |
| 2003/0043315 A1 | 3/2003 | Umemoto et al. | |
| 2003/0089214 A1 | 5/2003 | Fukuta et al. | |
| 2003/0156238 A1 | 8/2003 | Hiraishi et al. | |
| 2003/0174396 A1 | 9/2003 | Murayama et al. | |
| 2003/0180528 A1 | 9/2003 | Flosenzier et al. | |
| 2003/0189606 A1 | 10/2003 | Moon et al. | |
| 2004/0066645 A1 | 4/2004 | Graf et al. | |
| 2005/0126679 A1 | 6/2005 | Kim | |
| 2005/0249946 A1 * | 11/2005 | Hsu et al. | 428/353 |
| 2006/0035060 A1 * | 2/2006 | Koyama et al. | 428/141 |
| 2006/0098452 A1 | 5/2006 | Choi et al. | |
| 2006/0215265 A1 | 9/2006 | Miyatake et al. | |
| 2006/0245171 A1 | 11/2006 | Kim et al. | |
| 2006/0290253 A1 | 12/2006 | Yeo et al. | |
| 2007/0031997 A1 * | 2/2007 | Lee et al. | 438/123 |
| 2007/0228586 A1 | 10/2007 | Merrill et al. | |
| 2007/0297736 A1 | 12/2007 | Sherman et al. | |
| 2008/0305721 A1 | 12/2008 | Ohashi et al. | |
| 2009/0040772 A1 | 2/2009 | Laney | |
| 2009/0046229 A1 | 2/2009 | Umemoto et al. | |
| 2009/0120585 A1 | 5/2009 | Sampica et al. | |
| 2009/0126872 A1 | 5/2009 | Sampica et al. | |
| 2009/0153783 A1 | 6/2009 | Umemoto | |
| 2009/0183381 A1 | 7/2009 | Sampica et al. | |
| 2009/0183615 A1 | 7/2009 | Sampica et al. | |
| 2009/0186218 A1 | 7/2009 | Sampica et al. | |
| 2009/0279030 A1 | 11/2009 | Toyama et al. | |
| 2009/0279175 A1 | 11/2009 | Laney et al. | |
| 2010/0103353 A1 | 4/2010 | Yamada | |
| 2010/0297406 A1 | 11/2010 | Schaffer et al. | |
| 2011/0075070 A1 | 3/2011 | Kitagawa et al. | |
| 2011/0141405 A1 | 6/2011 | Kitagawa et al. | |
| 2011/0165361 A1 | 7/2011 | Sherman et al. | |

FOREIGN PATENT DOCUMENTS

| | | | |
|---|---|---|---|
| EP | 0711103 B1 | 5/1996 | |
| EP | 0 962 752 A1 | 12/1999 | |
| JP | 1-210328 A | 8/1989 | |
| JP | 5-200880 A | 8/1993 | |
| JP | 5-293895 A | 11/1993 | |
| JP | 6-051484 A | 2/1994 | |
| JP | 9-057779 A | 3/1997 | |
| JP | 10-156853 A | 6/1998 | |
| JP | 10-244589 A | 9/1998 | |
| JP | 2000-141388 A | 5/2000 | |
| JP | 2001-005401 | 1/2001 | |
| JP | 2001-166272 | 6/2001 | |
| JP | 2002-137352 | 5/2002 | |
| JP | 2002-313688 | 10/2002 | |
| JP | 2004-058349 | 2/2004 | |
| JP | 2004-233590 A | 8/2004 | |
| JP | 2006-218658 A | 8/2006 | |
| JP | 2006-222267 | 8/2006 | |
| JP | 2006-290960 A * | 10/2006 | |
| JP | 2006-334912 A | 12/2006 | |
| JP | 2007-206559 A | 8/2007 | |
| JP | 2008-238607 A | 10/2008 | |
| KR | 10-1999-029922 | 4/1999 | |
| KR | 10-2007-0016614 | 2/2007 | |
| WO | PCT/US92/07118 | 3/1993 | |
| WO | WO 93/05634 | 3/1993 | |
| WO | WO-2004/046230 A1 * | 3/2004 | |
| WO | WO 2005/098522 | 10/2005 | |
| WO | WO 2007/063818 | 6/2007 | |

OTHER PUBLICATIONS

US Office Action for U.S. Appl. No. 12/009,373, mail date Dec. 30, 2009, 14 pages.
Notice of Allowance for U.S. Appl. No. 12/009,373, mail date Jun. 16, 2010, 4 pages.
Office Action for U.S. Appl. No. 12/009,372, mail date Dec. 20, 2010, 10 pages.
Office Action for U.S. Appl. No. 12/009,472, mail date Jan. 14, 2011, 14 pages.
Office Action for U.S. Appl. No. 12/009,472, mail date Apr. 16, 2012, 16 pages.
Office Action for U.S. Appl. No. 13/538,957, mail date Oct. 5, 2012, 18 pages.
Notice of Allowance for U.S. Appl. No. 13/420,381, mail date Feb. 11, 2013, 12 pages.
Advisory Action for U.S. Appl. No. 12/009,472, mail date Feb. 25, 2013, 3 pages.
Office Action for U.S. Appl. No. 12/009,472, mail date Mar. 20, 2013, 15 pages.
Office Action for U.S. Appl. No. 12/786,169, mail date Jan. 18, 2013, 14 pages.
Notice of Allowance for U.S. Appl. No. 12/786,169, mail date Mar. 28, 2013, 6 pages.
International Search Report for Application No. PCT/US2009/031151, mail date Aug. 28, 2009, 3 pages.
Office Action for U.S. Appl. No. 12/009,482, mail date Feb. 21, 2012, 20 pages.
Office Action for U.S. Appl. No. 13/538,957, mail date Apr. 4, 2013, 19 pages.
Notice of Allowance for U.S. Appl. No. 13/420,381, mail date May 20, 2013, 8 pages.
Kipp, D.O. (2004;2010). Plastic Material Data Sheets. MatWeb—Division of Automation Creation, Inc., Online version available at: http://www.knovel.com/web/portal/browse/display?_EXT_KNOVEL_DISPLAY_bookid=1023&VerticalID=0, at least as early as Aug. 10, 2011, 6 pages.
Office Action for U.S. Appl. No. 12/009,372, mail date Jun. 13, 2011, 9 pages.
Office Action for U.S. Appl. No. 12/009,393, mail date Jul. 20, 2011, 8 pages.
Office Action for U.S. Appl. No. 12/009,482, mail date Aug. 16, 2011, 16 pages.
Office Action for U.S. Appl. No. 12/786,169, mail date Jul. 20, 2012, 8 pages.
Office Action for U.S. Appl. No. 13/420,381, mail date Sep. 18, 2012, 9 pages.
Office Action for U.S. Appl. No. 12/009,472, mail date Nov. 9, 2012, 15 pages.
Office Action for U.S. Appl. No. 12/009,482, mail date Nov. 21, 2012, 20 pages.

(56) References Cited

OTHER PUBLICATIONS

Notice of Allowance for U.S. Appl. No. 12/009,372, mail date Oct. 13, 2011, 8 pages.
Notice of Allowance for U.S. Appl. No. 12/009,393, mail date Nov. 14, 2011, 7 pages.
Office Action for U.S. Appl. No. 12/009,472, mail date Nov. 3, 2011, 15 pages.
U.S. Appl. No. 12/009,372, filed Jan. 18, 2008, Sampica et al.
U.S. Appl. No. 12/009,373, filed Jan. 18, 2008, Sampica et al.
U.S. Appl. No. 12/009,393, filed Jan. 18, 2008, Sampica et al.
U.S. Appl. No. 12/009,472, filed Jan. 18, 2008, Sampica et al.
U.S. Appl. No. 12/009,482, filed Jan. 18, 2008, Barnidge et al.
U.S. Appl. No. 11/214,518, filed Aug. 30, 2005, Sampica et al.
Walker, Geoff, GD-Itronix Dynavue Technology, The Ultimate Outdoor-Readable Touch-Screen Display, Rugged PC Review, pp. 1-4, United States of America.
Geoff Walker, GD-Itronix Dynavue Technology: The Ultimate Outdoor-Readable Touch-Screen Display, Rugged PC Review, pp. 1-4, Publisher: Rugged PC Review, Published in: US.

\* cited by examiner

SUBSTRATE LAMINATION SYSTEM AND METHOD

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

The present application constitutes a continuation-in-part of U.S. patent application Ser. No. 11/214,518, entitled PROCESS FOR GLASS-TO-GLASS SEALING OLEDS WITH DRY FILM ADHESIVE, naming James D. Sampica, Paul R. Nemeth and Vincent P. Marzen as inventors, filed Aug. 30, 2005, now U.S. Pat. No. 7,566,254, or is an application of which a currently co-pending application is entitled to the benefit of the filing date.

The present application constitutes a continuation-in-part of U.S. patent application Ser. No. 11/215,683, entitled PANEL-TO-PANEL LAMINATION METHOD FOR IMPROVED UNIFORMITY, naming Vincent P. Marzen, Paul R. Nemeth and James D. Sampica as inventors, filed Aug. 30, 2005, now U.S. Pat. No. 7,435,311, or is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

BACKGROUND

Liquid crystal display (LCD) screens and other monitors may require rigid or semi-rigid substrates to be coupled to the display. These substrates may serve many purposes including optical enhancements, protection from impact, or environmental concerns, or sometimes to improve thermal operating range, such as heating elements. As such, proper lamination of multiple substrates, such as a rigid glass substrate to an LCD screen, may desirable.

SUMMARY

The present disclosure is directed to a substrate lamination system and method.

A method for laminating substrates may comprise: (a) disposing a pressure-sensitive adhesive layer between a substantially planar surface of a first substrate and a substantially planar surface of a second substrate; (b) disposing the first substrate, pressure-sensitive adhesive layer and second substrate within a vacuum chamber; (c) evacuating the vacuum chamber; (d) applying pressure to at least one of the first substrate and the second substrate.

A system for laminating substrates may comprise: (a) means for disposing a pressure-sensitive adhesive layer between a substantially planar surface of a first substrate and a substantially planar surface of a second substrate; (b) means for disposing the first substrate, pressure-sensitive adhesive layer and second substrate within a vacuum chamber; (c) means for evacuating the vacuum chamber; (d) means for applying pressure to at least one of the first substrate and the second substrate It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
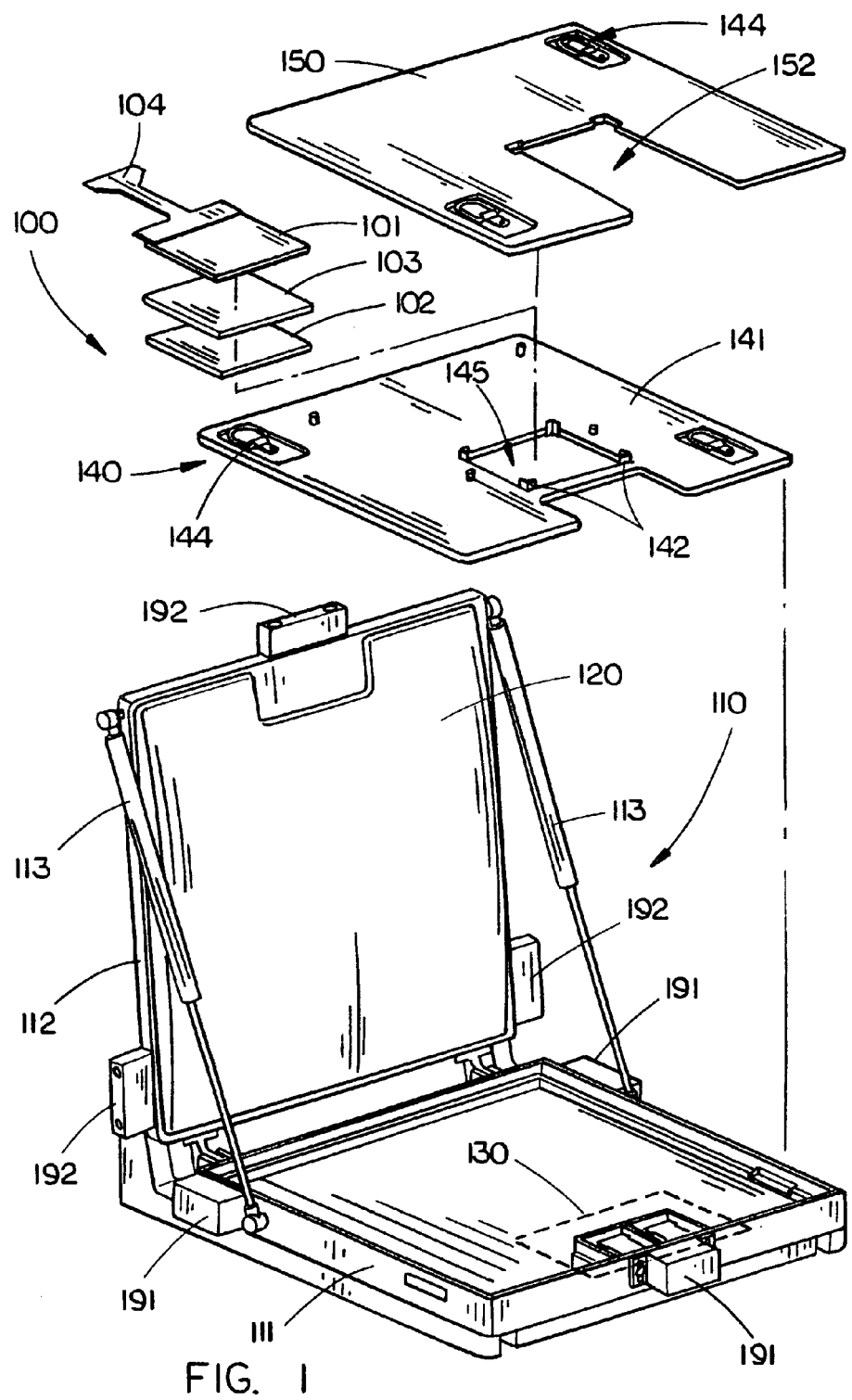
FIG. 1 is an isometric view of a substrate lamination system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 18:
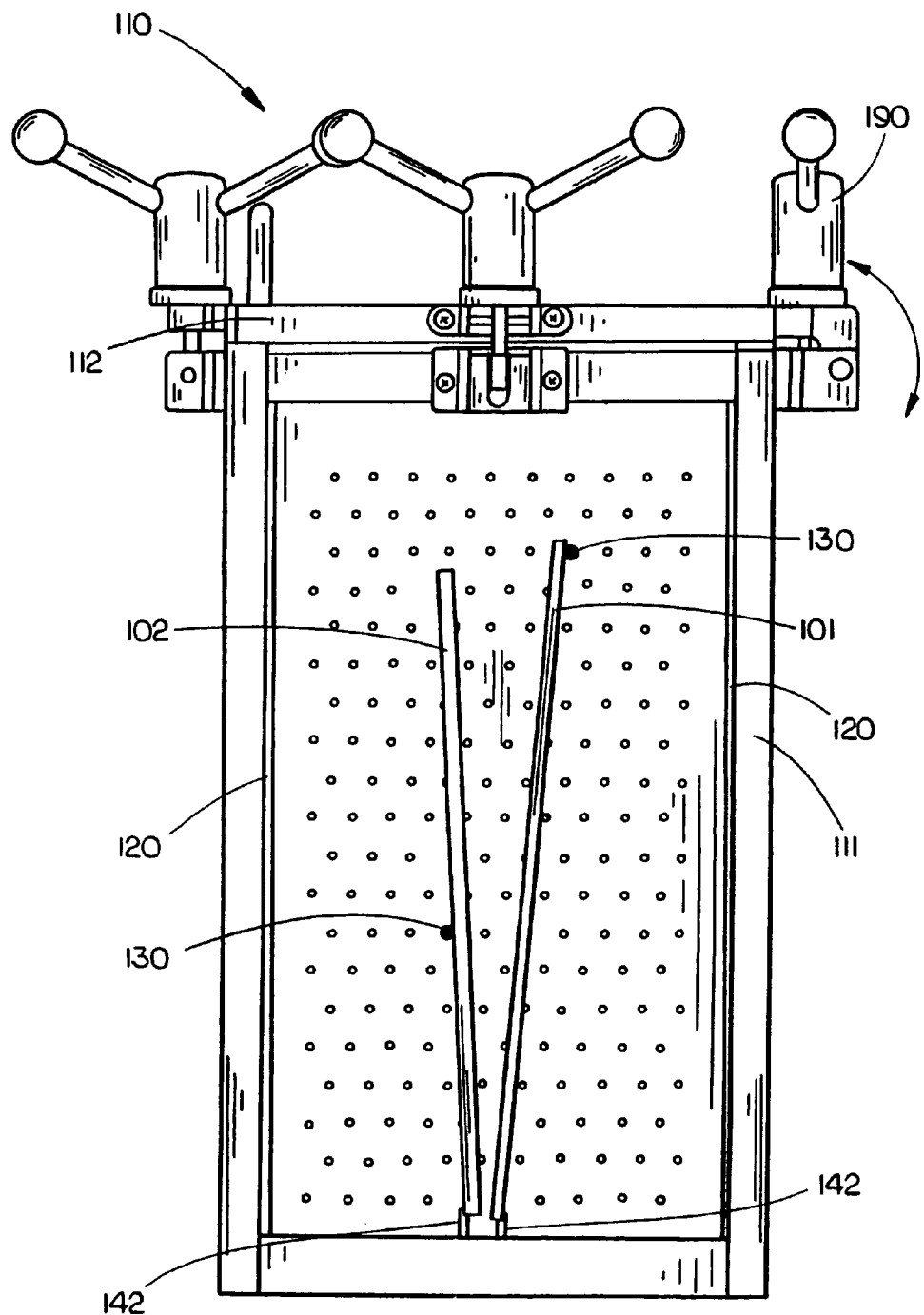
FIG. 18 is a cross-sectional view of a substrate lamination system.

FIGS. 1 and 18 illustrate example systems in which one or more technologies may be implemented. A lamination system 100 may comprise a vacuum chamber 110, at least one flexible membrane 120, and a substrate support 130.

The vacuum chamber 110 may be any container which is capable of being sealed so as to separate a space interior to the vacuum chamber 110 from a space exterior to the vacuum chamber 110. For example, the vacuum chamber 110 may be a generally rectangular structure having a vacuum chamber body 111 and a vacuum chamber lid 112. The vacuum chamber 110 may be constructed of any number of materials having sufficient strength so as to maintain a vacuum such as aluminum, steel, carbon fiber, plastics, and the like.

Figure 2:
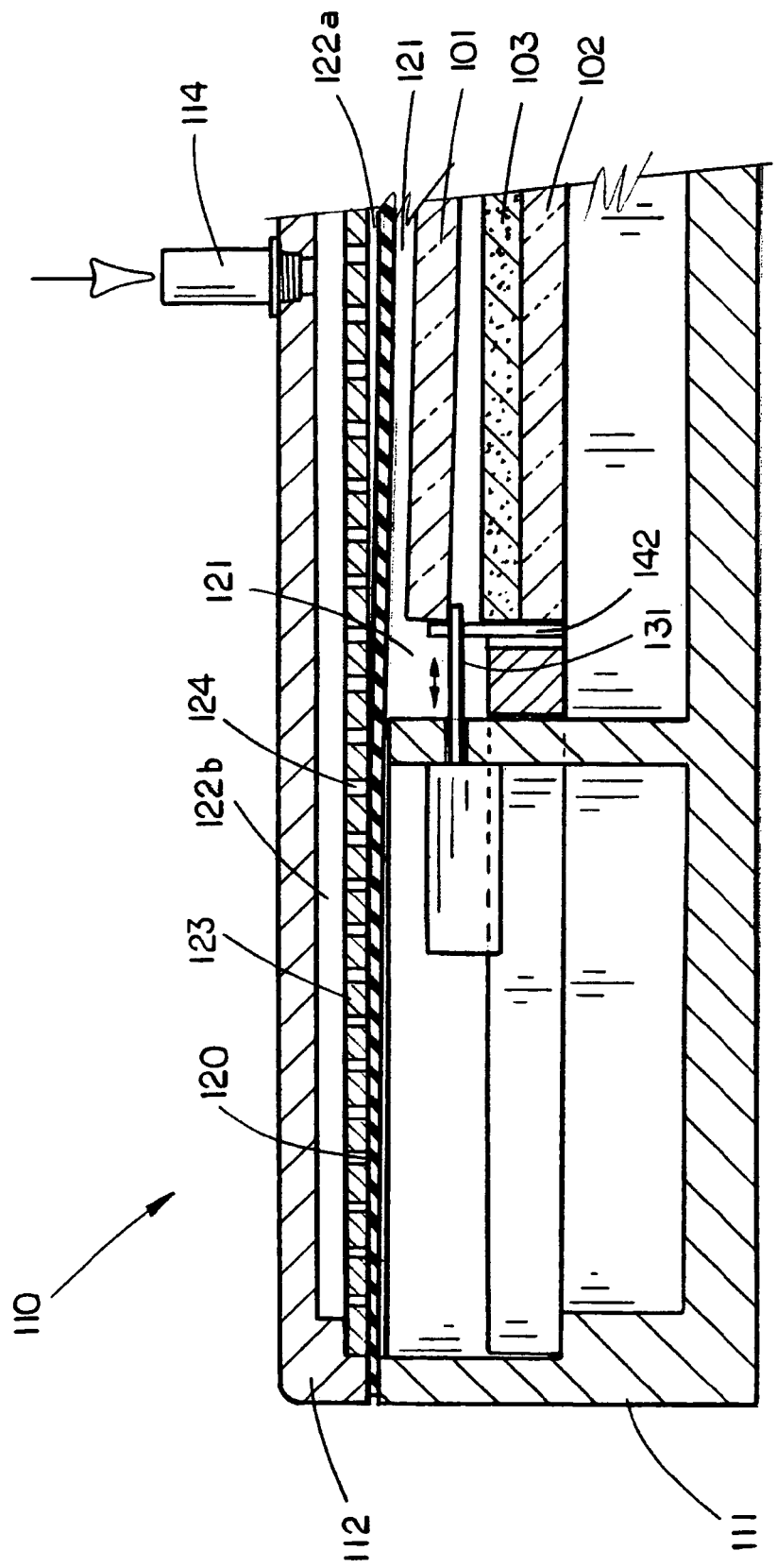
FIG. 2 is an cross-sectional view of a substrate lamination system.
Figure 3:
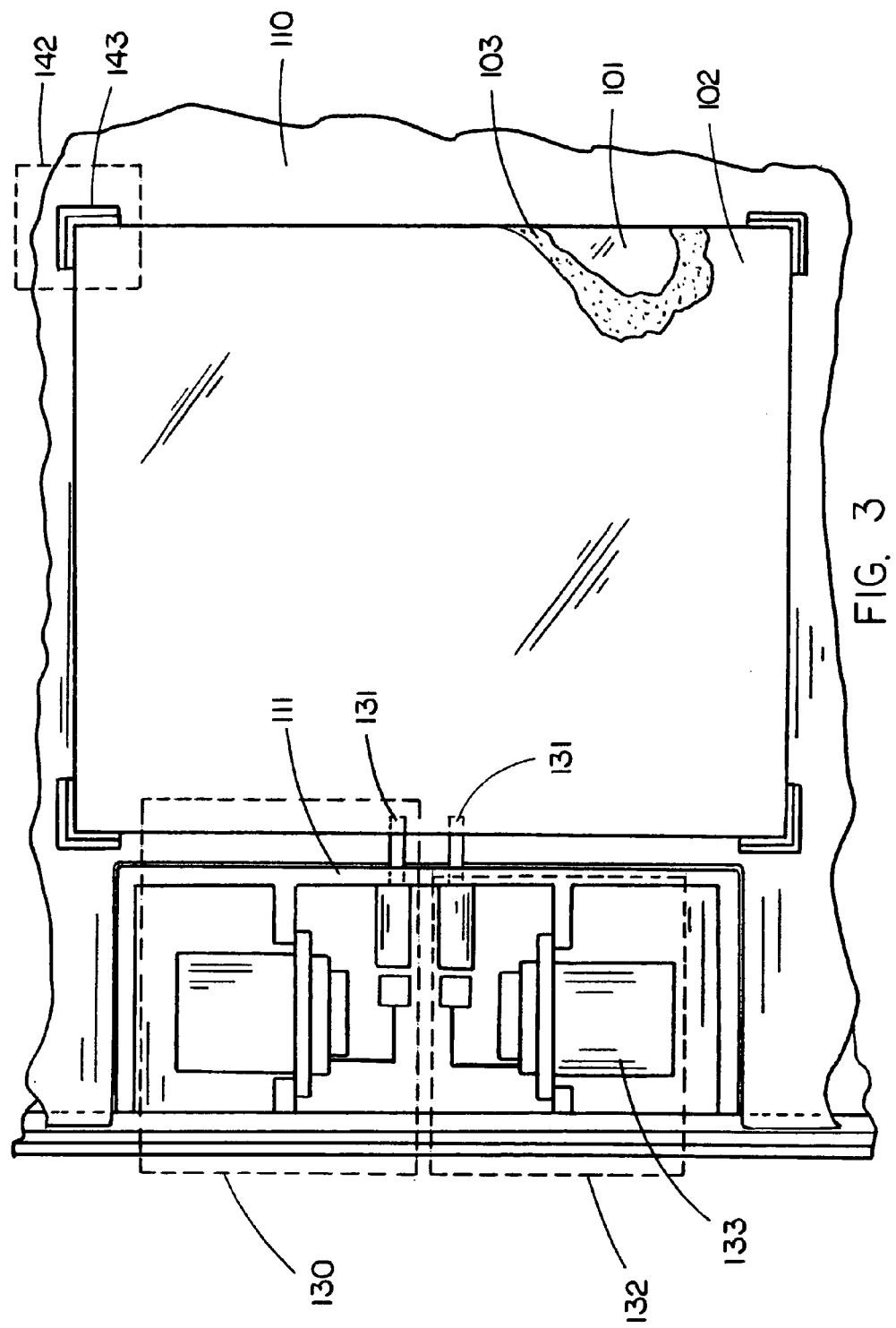
FIG. 3 top view of a substrate lamination system.

Referring now to FIG. 2, the flexible membrane 120 may be disposed within the vacuum chamber 110 so as to partition the vacuum chamber 110 into at least a first compartment 121 and a second compartment 122. For example, the flexible membrane 120 may be affixed to an underside of the vacuum chamber lid 112 by sealing the flexible membrane 120 about the periphery of the vacuum chamber lid 112 so as to partition the vacuum chamber 110 into a first compartment 121 formed by the flexible membrane 120 and the vacuum chamber body 111 and a second compartment 122 formed by the flexible membrane 120 and the vacuum chamber lid 112.

The second compartment 122 may comprise an expansion portion 122A and a plenum portion 122B separated by a perforated plenum diffuser screen 123. The perforated plenum diffuser screen 123 may serve to provide uniform distribution of airflow from the plenum portion 122B into the expansion portion 122A.

The flexible membrane 120 may be constructed from any flexible material capable of partitioning two compartments into separate pressure zones. For example, the flexible membrane 120 may be constructed of silicone rubber. The flexible membrane 120 may have one or more of the following physical characteristics: an elongation capacity of at least 100%; a tear strength of at least 30 psi; anti-static properties and/or an anti-static liner (e.g. polyester or polyethylene) disposed on one or more surfaces of the flexible membrane 120.

In other exemplary embodiments, the lamination system 100 may comprise at least one lid positioning mechanism 113. The lid positioning mechanism 113 may serve to maintain the vacuum chamber lid 112 in an open position with respect to the vacuum chamber body 111. The lid positioning mechanism 113 may comprise a gas cylinder mechanism as depicted in FIG. 1. In still further exemplary embodiments, the lid positioning mechanism 113 may comprise an actuated mechanism (e.g. a pneumatically actuated system, [not shown]) which may be extended or retracted manually or as part of an automated system controlled by a processing unit.

Referring now to FIGS. 3-18, the substrate support 130 may be any device/structure capable of maintaining a first substrate 101 and a second substrate 102 in spatial separation when disposed within the vacuum chamber 110. The substrate support 130 may maintain the first substrate 101 and/or the second substrate 102 in semi-horizontal positions as in FIG. 2 or in semi-vertical positions as in FIG. 18. For example, the substrate support 130 may comprise at least one retractable support pin 131. The retractable support pin 131 may be disposed within and project from a wall of the vacuum chamber body 111. The retractable support pin 131 may be operably coupled to an actuating mechanism 132. Further, the use of any number of substrate supports 130 supporting any number of substrates is fully contemplated by the presently described embodiments.

The cross-geometry of the tip of the retractable support pin 131 may be selected from any number of geometries including, but not limited to: cylindrical, square, hemispherical, trapezoidal, and the like. The geometry may be selected so as to minimize contact with a substrate while providing adequate substrate support.

Figure 7:
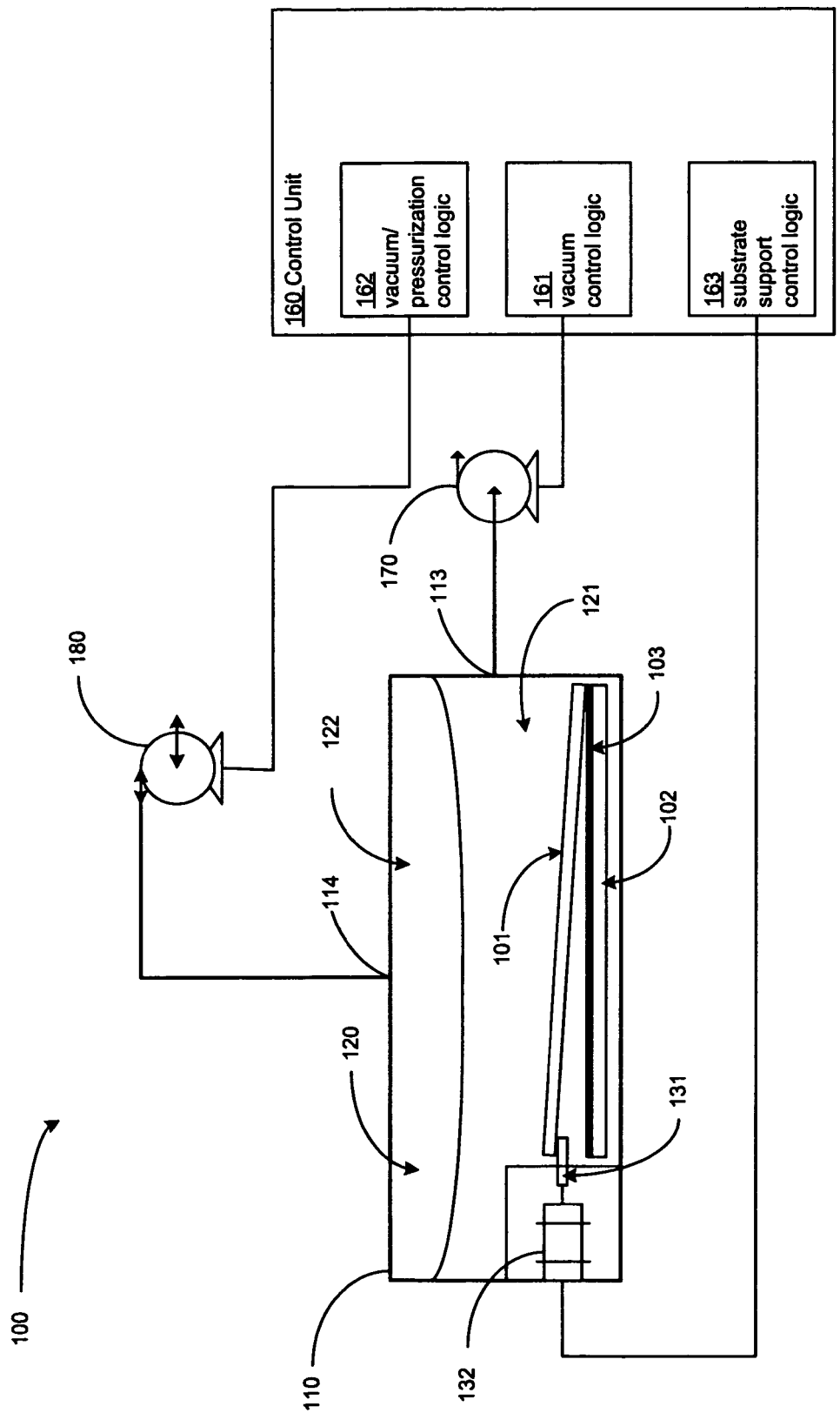
FIG. 7 an schematic view of a substrate lamination system.

The actuating mechanism 132 may comprise a motor 133 configured to translate the retractable support pin 131 in and out of the vacuum chamber 110. The operation of the motor 133 and the corresponding insertion or retraction of the retractable support pin 131 may be controlled by a control unit 160, as shown in FIG. 7.

In other exemplary embodiments, the substrate support 130 may comprise a deformable support (e.g. a foam or putty structure; a spring structure) an electromagnetic support (e.g. an electromagnet operably couplable to a metallic element), retractable air cylinder or solenoid.

The first substrate 101 and/or second substrate 102 may be rigid or semi-rigid in nature such that, when supported by the substrate support 130, the first substrate 101 and/or second substrate 102 do not deform to a degree such that they contact a layer disposed in a horizontal plane beneath the first substrate 101 and/or second substrate 102, such as a pressure-sensitive adhesive layer 103. For example, the first substrate 101 may comprise a display monitor (e.g. an LCD, LCoS, or LED screen). The second substrate 102 may comprise an opaque rigid or semi-rigid reinforcing layer (e.g. glass, plastic). The pressure-sensitive adhesive layer 103 may comprise commonly known acrylic or silicone based polymers.

Figure 4:
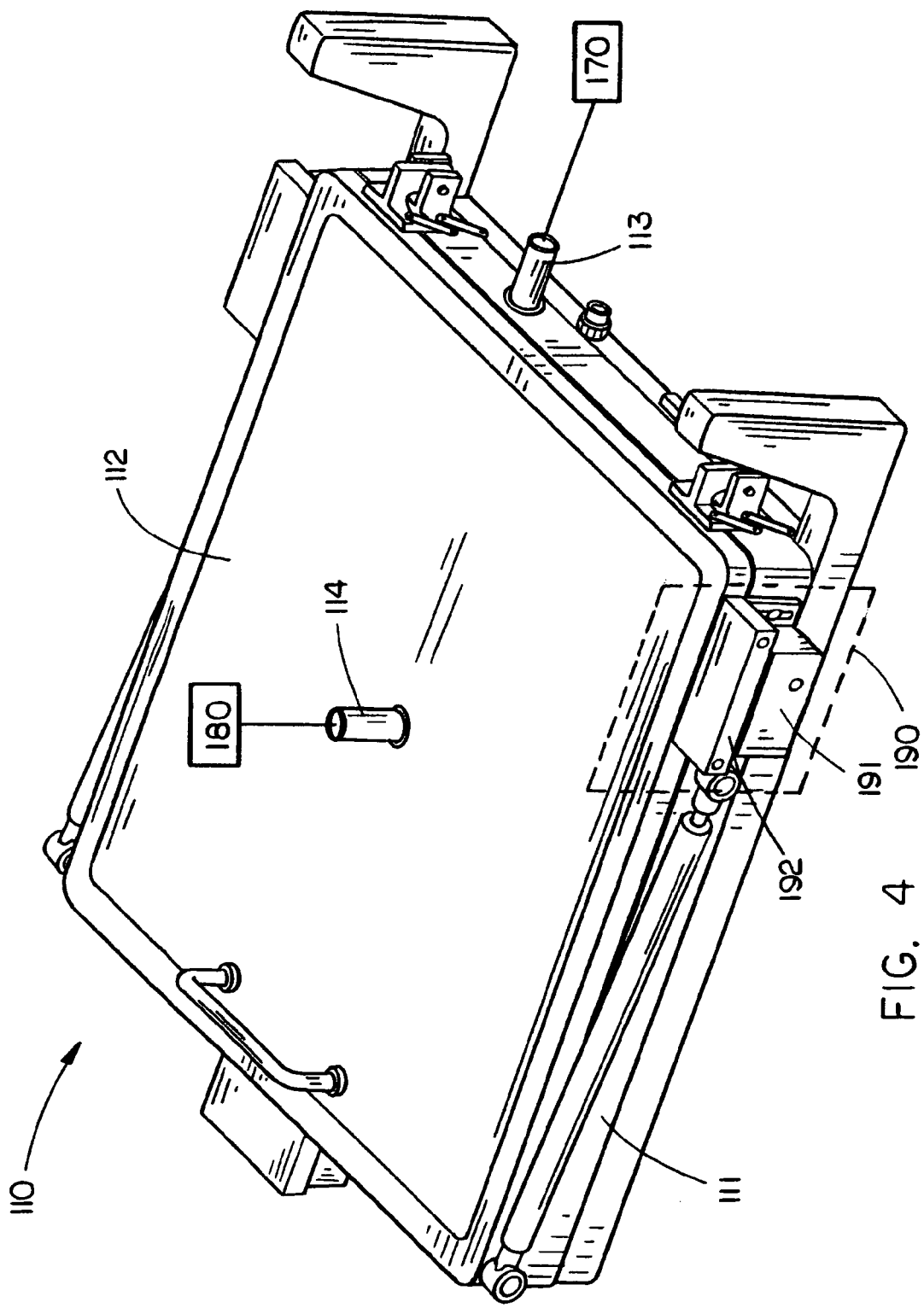
FIG. 4 is an isometric view of a substrate lamination system.
Figure 5:
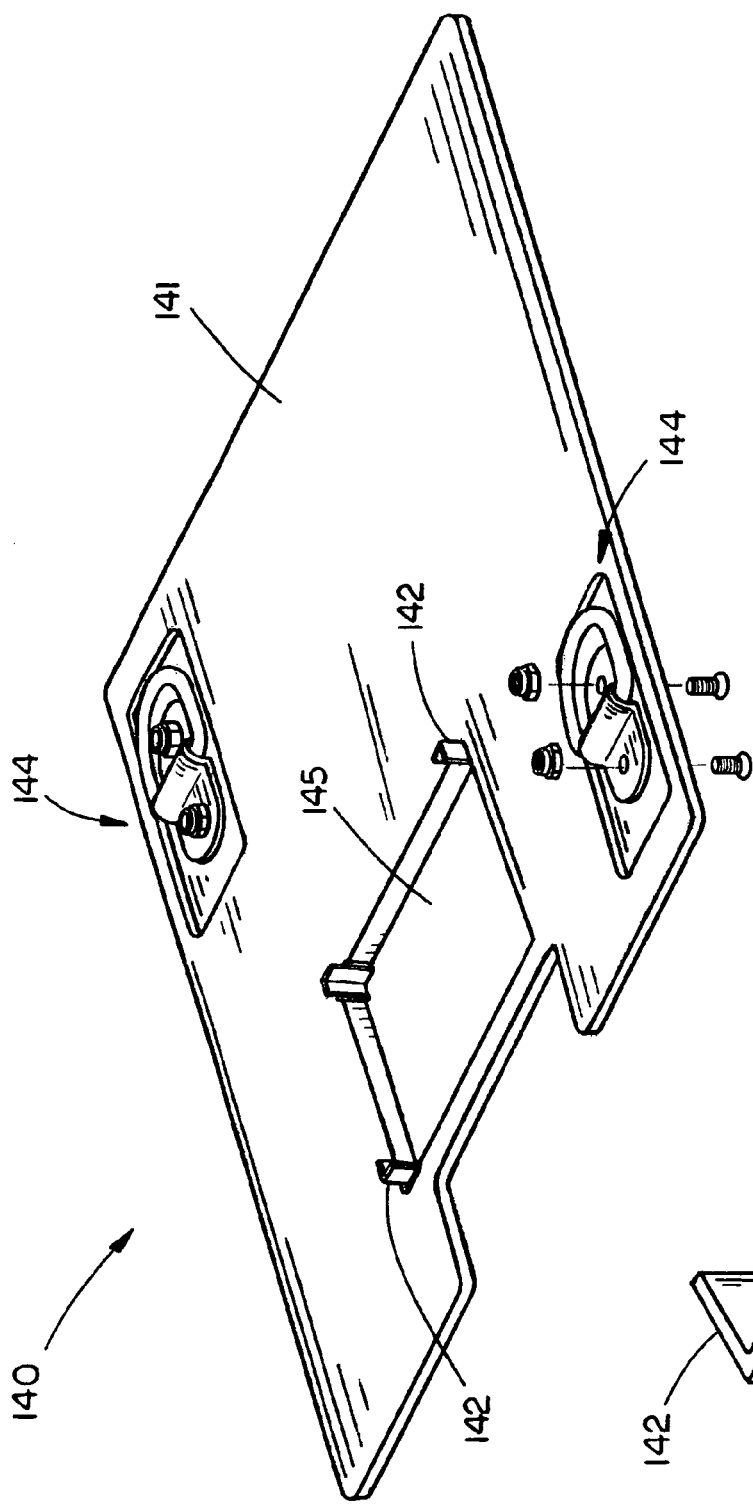
FIGS. 5A and 5B are an isometric view of a substrate alignment insert.

Referring to FIG. 4, the vacuum chamber 110 may further comprise a vacuum port 113 so as to provide a connection for a vacuum line (not shown) operably coupled to a vacuum pump 170. The vacuum port 113 may be operably coupled to the vacuum chamber body 111 to provide a conduit between the first compartment 121 and the vacuum pump 170.

The vacuum chamber 110 may further comprise a vacuum/pressurization port 114 so as to provide a connection for a vacuum/compressor line (not shown) operably coupled to a vacuum pump/compressor 180. The vacuum/pressurization port 114 may be operably coupled to the vacuum chamber lid 112 to provide a conduit between the second compartment 122 and the vacuum pump/compressor 180.

In still another exemplary embodiment, the lamination system 100 may comprise at least one locking mechanism 190. The locking mechanism 190 may serve to secure the vacuum chamber lid 112 to the vacuum chamber body 111 so that the interior of the vacuum chamber 110 may be evacuated. For example, locking mechanism 190 may comprise an electromagnetic lock having an electromagnet 191 and a metal element 192 operably couplable to the electromagnet so as to maintain the vacuum chamber lid 112 and the vacuum chamber body 111 in a locked position, thereby creating an adequate seal via the flexible membrane 120.

Referring again to FIG. 5A, the lamination system 100 may further comprise a substrate alignment insert 140. The substrate alignment insert 140 may serve to align at least one the first substrate 101 and the second substrate 102 within the vacuum chamber 110. The substrate alignment insert 140 may comprise a base portion 141 (e.g. the floor of the vacuum chamber body 111 or a separate base layer) and at least one substrate alignment guide 142. For example, the substrate alignment guide 142 may comprise two substantially adjacent wall portions configured at a 90° angle with respect to one another and projecting from the base portion 141 so as to receive at least one substrate within the space defined by the angle of the wall portions.

In alternate exemplary embodiments, the substrate alignment guide 142 may be selected from brackets, pegs, grooves, bumps, slots, a recessed space within a body, and/or any other suitable mechanism for specifically positioning a substrate within the vacuum chamber 110.

In an alternate exemplary embodiment, the base portion 141 of the substrate alignment insert 140 may further comprise a recessed region 145 suitable for receiving at least one of the first substrate 101 and the second substrate 102.

Figure 6:
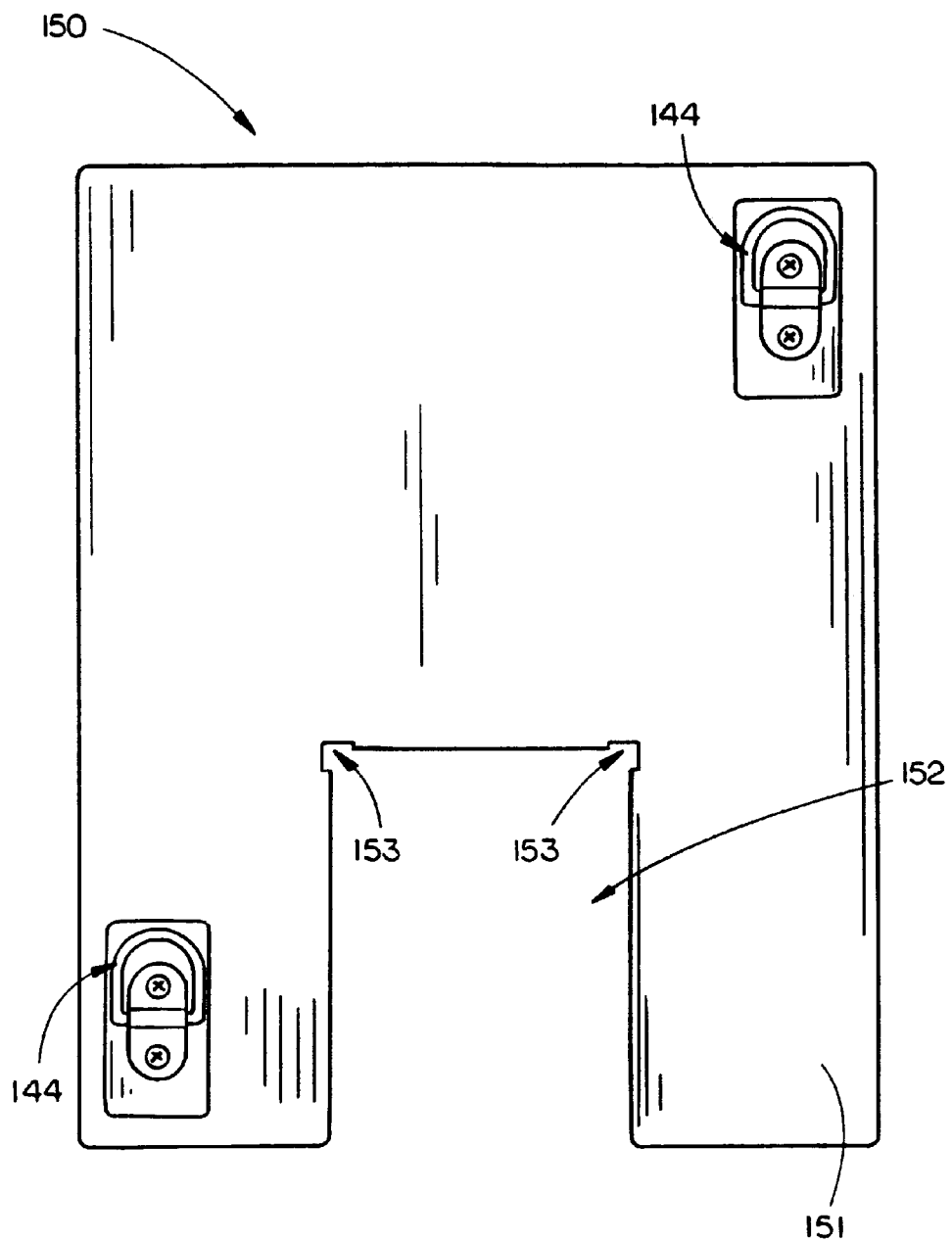
FIG. 6 is a top view of a substrate mask.

Referring to FIG. 6, the lamination system 100 may further comprise a carriage or substrate mask 150. The substrate mask 150 may comprise a substantially planar mask body 151 defining a mask aperture 152. The mask aperture 152 may be configured so as to fit around at least one substrate alignment guide 142. For example, the mask aperture 152 may comprise alignment guide aperture portions 153 may be which allow the substrate mask 150 to be secured around at least one substrate alignment guide 142. The substrate mask 150 may serve to protect portions of or the second substrate 102 which are outside the periphery of the mask aperture 152, such as flexible circuitry 104 coupled to the first substrate 101.

Referring to FIG. 5B, in an alternate exemplary embodiment, the at least one substrate alignment guide 142 may comprise a substrate mask support portion 143. The substrate mask support portion 143 may allow the substrate alignment guide 142 to support the substrate mask 150 in spatial separation from the base portion 141 when the substrate mask 150 is disposed atop the substrate alignment insert 140.

In still another exemplary embodiment, the substrate alignment insert 140 and/or the substrate mask 150 may be removable from the lamination system 100 so as to allow for the lamination of different sizes of substrates. To effectuate the removal of the substrate alignment insert 140 and/or the substrate mask 150, at least one handle member 144 may be provided.

In still further exemplary embodiments, lamination system 100 components may incorporate electrostatic discharge (ESD) prevention technologies. For example, the substrate alignment insert 140 and/or the substrate mask 150 may be constructed from materials having desirable ESD properties. Further, the substrate alignment insert 140, the substrate mask 150 and/or any other lamination system 100 component may be connected to electrical ground via ground lines. Further, the lamination system 100 components may be subjected to ionization such that charged surfaces will dissipate that charge through controlled methods. Such ionization may be conducted prior to bringing sensitive substrates, such as sensitive electronic substrates into close proximity with the lamination system 100.

Referring to FIG. 7, the lamination system 100 may further comprise a control unit 160. The control unit 160 unit may comprise vacuum control logic 161, vacuum/pressurization control logic 162 and/or substrate support control logic 163. The vacuum control logic 161, vacuum/pressurization control logic 162, and/or substrate support control logic 163 may comprise integrated logic (e.g. application specific integrated circuitry (ASIC), field programmable gate arrays (FPGA), digital signal processors (DSP)), a programmable logic controller (PLC) or one or more programs (e.g. firmware or software) configured to run on one or more processors (e.g. processors marketed by Intel® and AMD® integrated into personal computers (PCs)).

The vacuum control logic 161 may be configured to provide control signals to a vacuum pump 170 operably coupled to the vacuum chamber 110 via vacuum port 113 to create a vacuum within the first compartment 121.

The vacuum/pressurization control logic 162 may be configured to provide control signals to vacuum pump/compressor 180 operably coupled to the vacuum chamber 110 via vacuum/pressurization port 114 to create a vacuum or pressurization within the second compartment 122.

The substrate support control logic 163 may be configured to provide control signals to the actuating mechanism 132 to either insert or retract the retractable support pin 131.

Figure 8:
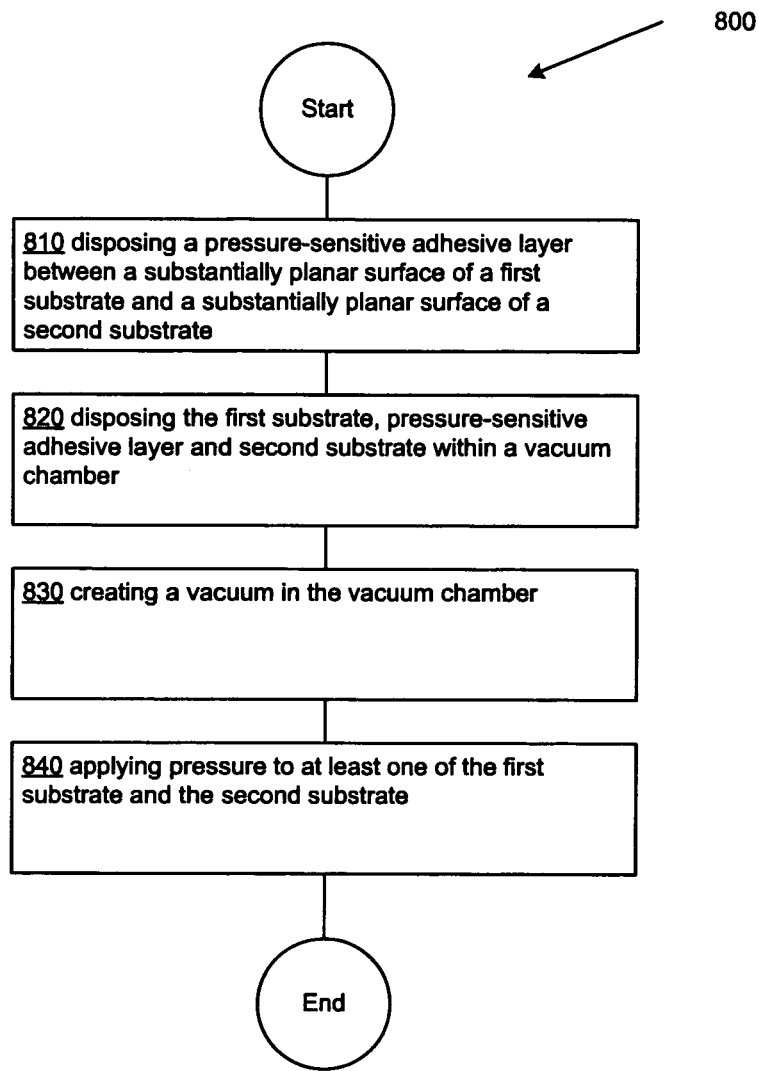
FIG. 8 is a high-level logic flowchart of a process.

FIG. 8 illustrates an operational flow 800 representing example operations related to lamination of one or more substrates with a pressure sensitive adhesive. In FIG. 8 and in following figures that include various examples of operational flows, discussion and explanation may be provided with respect to the above-described examples of FIGS. 1 through 7, and/or with respect to other examples and contexts. However, it should be understood that the operational flows may be executed in a number of other environments and contexts, and/or in modified versions of FIGS. 1 through 7. Also, although the various operational flows are presented in the sequence(s) illustrated, it should be understood that the various operations may be performed in other orders than those which are illustrated, or may be performed concurrently.

After a start operation, the operational flow 800 moves to a disposing operation 810, where disposing a pressure-sensitive adhesive layer between a substantially planar surface of a first substrate and a substantially planar surface of a second substrate may occur. For example, as shown in FIGS. 1 through 7, the pressure-sensitive adhesive layer 103 may be disposed between the first substrate 101 and the second substrate 102. Disposing operation 810 may be conducted in either a manual fashion (e.g. by an operator) or an automated fashion whereby an automated disposing apparatus (e.g. a robotic arm configured to dispose the pressure-sensitive adhesive layer 103 between the first substrate 101 and the second substrate 102) such as those commonly found in the manufacturing arts may be employed.

Then, in a disposing operation 820, disposing the first substrate, pressure-sensitive adhesive layer and second substrate within a vacuum chamber may occur. For example, as shown in FIGS. 1 through 7, the first substrate 101, the second substrate 102, and the pressure-sensitive adhesive layer 103 may be disposed within the vacuum chamber 110. Disposing operation 820 may be conducted in either a manual fashion (e.g. by an operator) or an automated fashion whereby an automated disposing apparatus (e.g. a robot arm configured to dispose the pressure-sensitive adhesive layer 103 between the first substrate 101 and the second substrate 102) such as those commonly found in the manufacturing arts may be employed.

Then, in an evacuation operation 830, evacuating the vacuum chamber may occur. For example, as shown in FIGS. 1 through 7, the vacuum control logic 161 may cause the vacuum pump 170 to evacuate the first compartment 121 of the vacuum chamber 110 via vacuum port 113. During vacuum operation 830, the vacuum/pressurization port 114 or the inlet of the vacuum pump/compressor 180 may be sealed so as to limit any deformation of the flexible membrane 120 during the evacuation of the vacuum chamber 110.

Then, in a pressure application operation 840, applying pressure to at least one of the first substrate and the second substrate may occur. For example, as shown in FIGS. 1 through 7, the vacuum/pressurization control logic 162 may cause the vacuum pump/compressor 180 to pressurize the second compartment 122 of the vacuum chamber 110 via vacuum/pressurization port 114. The pressurization of the second compartment 122 may induce a deformation of the flexible membrane 120 in at least the general direction of the first substrate 101, the second substrate 102, and the pressure-sensitive adhesive layer 103. Such a deformation may press the first substrate 101, the second substrate 102, and the pressure-sensitive adhesive layer 103 together, thereby attaching the pressure-sensitive adhesive layer 103 so as to laminate the first substrate 101 and the second substrate 102 to one another.

In other exemplary embodiments, the flexible membrane 120 may comprise a vacuum bag (not shown) which may be disposed within the vacuum chamber 110, there by defining the first compartment 121 inside the vacuum bag and the second compartment 122 outside the bag. The vacuum bag may at least substantially surround the first substrate 101, the second substrate 102, and the pressure-sensitive adhesive layer 103 within the first compartment 121.

Figure 9:
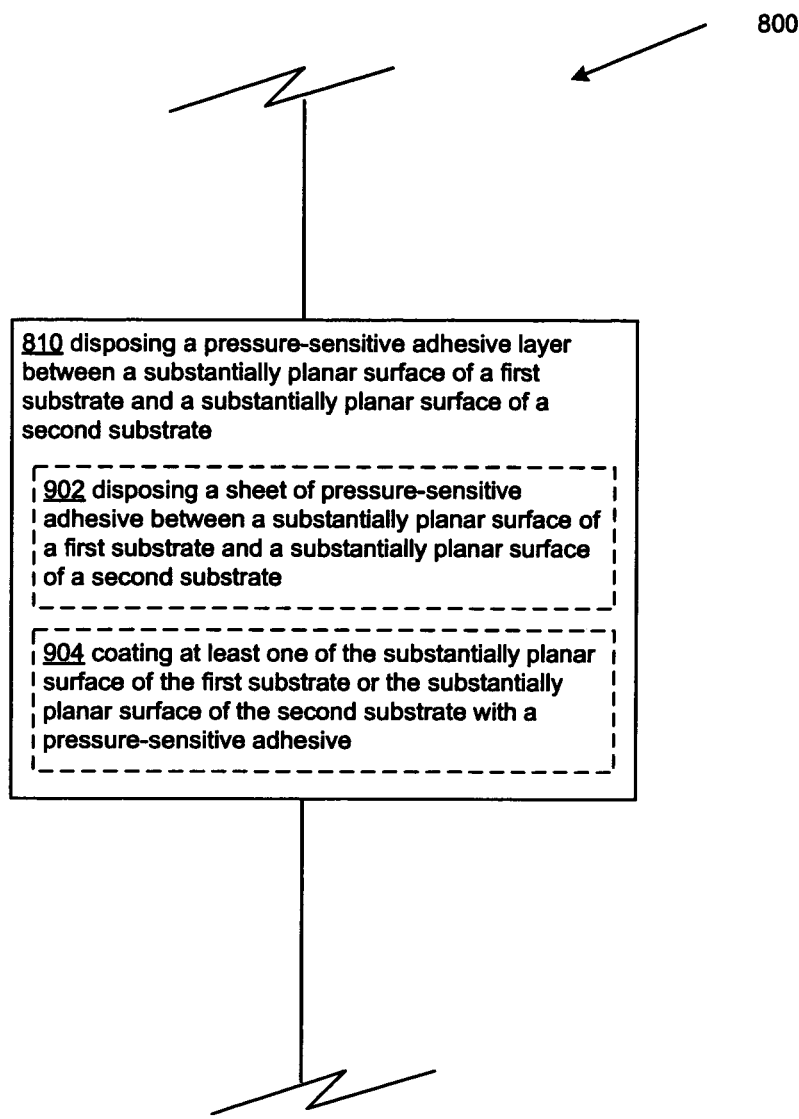
FIG. 9 is a high-level logic flowchart of a process depicting alternate implementations of FIG. 8.

FIG. 9 illustrates alternative embodiments of the example operational flow 800 of FIG. 8. FIG. 9 illustrates example embodiments where the disposing operation 810 may include at least one additional operation. Additional operations may include an operation 902, and/or an operation 904.

At the operation 902, disposing a sheet of pressure-sensitive adhesive between a substantially planar surface of a first substrate and a substantially planar surface of a second substrate may occur. For example, as shown in FIGS. 1 through 7, the pressure-sensitive adhesive layer 103 may be a preformed adhesive sheet which may be mechanically disposed between the first substrate 101 and the second substrate 102.

At the operation 904, coating at least one of the substantially planar surface of the first substrate or the substantially planar surface of the second substrate with a pressure-sensitive adhesive may occur. For example, as shown in FIGS. 1 through 7, the pressure-sensitive adhesive layer 103 may be a cured-state polymer-based pressure sensitive adhesive composition which may be coated on a surface of at least one of the first substrate 101 and the second substrate 102.

Figure 10:
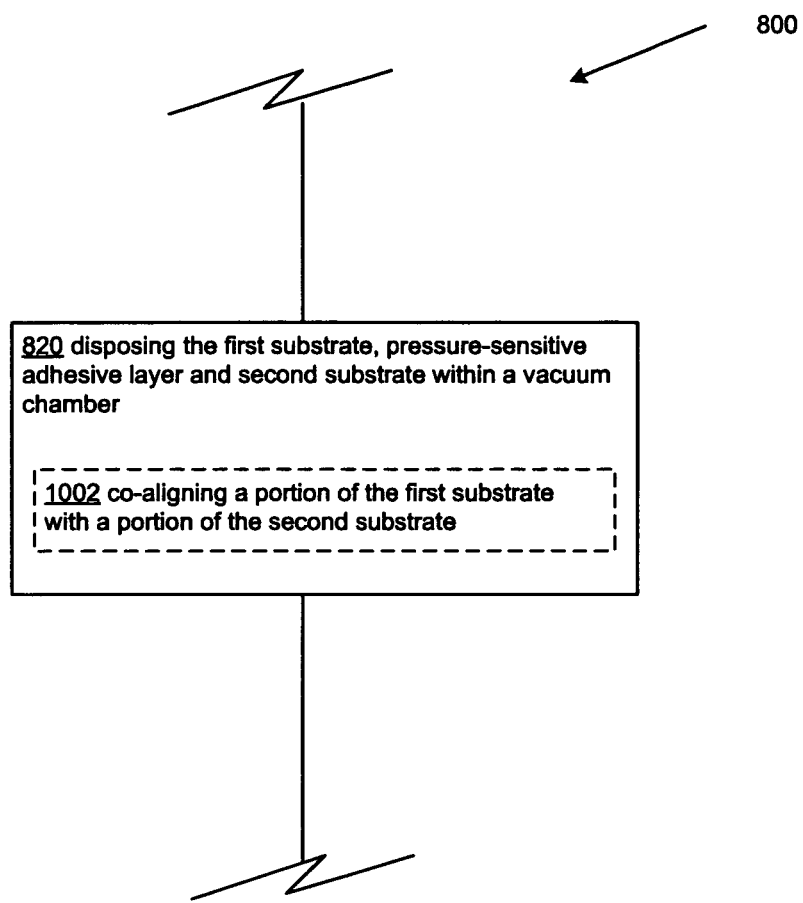
FIG. 10 is a high-level logic flowchart of a process depicting alternate implementations of FIG. 8.

FIG. 10 illustrates alternative embodiments of the example operational flow 800 of FIG. 8. FIG. 10 illustrates example embodiments where the disposing operation 820 may include at least one additional operation. Additional operations may include an operation 1002.

At the operation 1002, co-aligning a portion of the first substrate with a portion of the second substrate may occur. For example, as shown in FIGS. 1 through 7, the at least one of the first substrate 101 and the second substrate 102 may be placed within the substrate alignment insert 140 so as to maintain the substrate in a substantially static position during the vacuum creation operation 830 or the pressure application operation 840. Such alignment may ensure that desired portions of at least one of the first substrate 101 and the second substrate 102 are contacted with the pressure-sensitive adhesive layer 103 while minimizing contact with undesired portions of the first substrate 101 and/or the second substrate 102.

Figure 11:
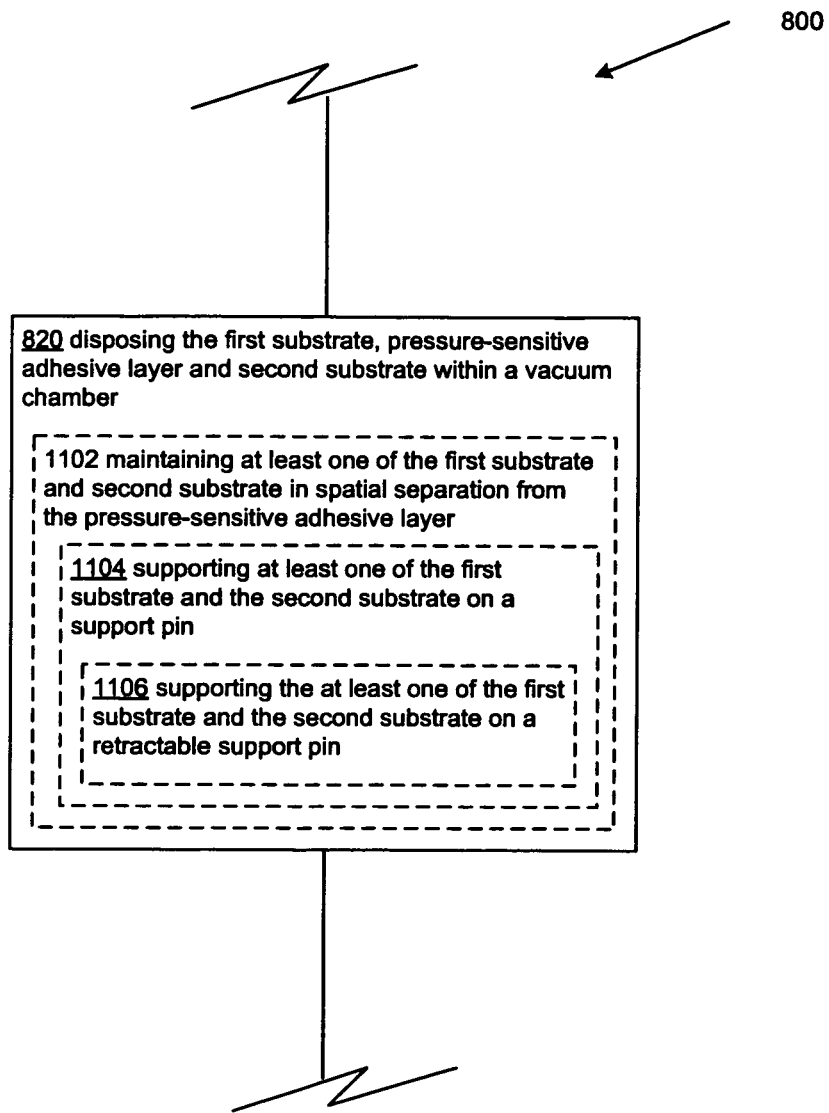
FIG. 11 is a high-level logic flowchart of a process depicting alternate implementations of FIG. 8.

FIG. 11 illustrates alternative embodiments of the example operational flow 800 of FIG. 8. FIG. 11 illustrates example embodiments where the disposing operation 820 may include at least one additional operation. Additional operations may include an operation 1102, an operation 1104, and/or an operation 1106.

At the operation 1102, maintaining at least a portion of at least one of the first substrate and second substrate in spatial separation from the pressure-sensitive adhesive layer may occur. For example, as shown in FIGS. 1 through 7, during the vacuum creation operation 830, portions of at least one of the first substrate 101 and the second substrate 102 are maintained in spatial separation from the pressure-sensitive adhesive layer 103 by the substrate support 130 so as to allow for a substantially complete evacuation of air between the substrate and the pressure-sensitive adhesive, thereby limiting the entrainment of air between the first substrate 101 and the second substrate 102. Further, at the operations 1104 and 1106, supporting at least one of the first substrate and the second substrate on a support pin may occur. For example, as shown in FIGS. 1 through 7, a retractable support pin 131 may maintain at least one of the first substrate 101 and the second substrate 102 in spatial separation from the pressure-sensitive adhesive layer 103.

Figure 12:
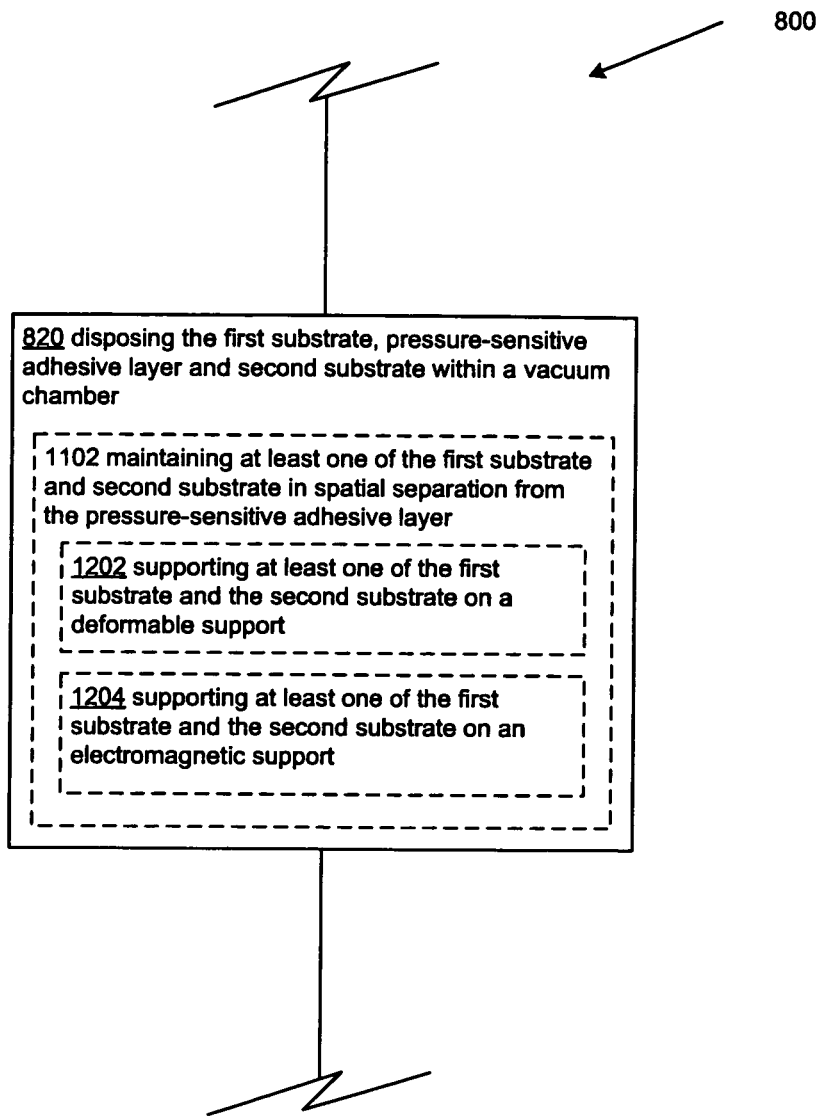
FIG. 12 is a high-level logic flowchart of a process depicting alternate implementations of FIG. 8.

FIG. 12 illustrates alternative embodiments of the example operational flow 800 of FIG. 8. FIG. 12 illustrates example embodiments where the disposing operation 820 may include at least one additional operation. Additional operations may include an operation 1202, and/or an operation 1204. Further, at the operation 1202, supporting at least one of the first substrate and the second substrate on a deformable support may occur. For example, as shown in FIGS. 1 through 7, the substrate support 130 may include a deformable support such as a foam, putty structure or a spring having sufficient spring forces such that the substrate support 130 remains in an expanded configuration until a pressure is applied to at least one of the first substrate 101 and the second substrate 102, such as by the expansion of the flexible membrane 120. Further, at the operation 1204, supporting at least one of the first substrate and the second substrate on an electromagnetic support may occur. For example, as shown in FIGS. 1 through 7, the at least one of the first substrate 101 and the second substrate 102 may be operably coupled to a metal element which may be contacted to an electromagnet disposed within the vacuum chamber 110, such as to the vacuum chamber lid 112. Upon the application of power to the electromagnet, the metal element operably coupled to the at least one of the first substrate 101 and the second substrate 102 may be magnetically attracted to the electromagnet, thereby supporting the at least one of the first substrate 101 and the second substrate 102 is spatial separation from the pressure-sensitive adhesive layer 103.

Figure 13:
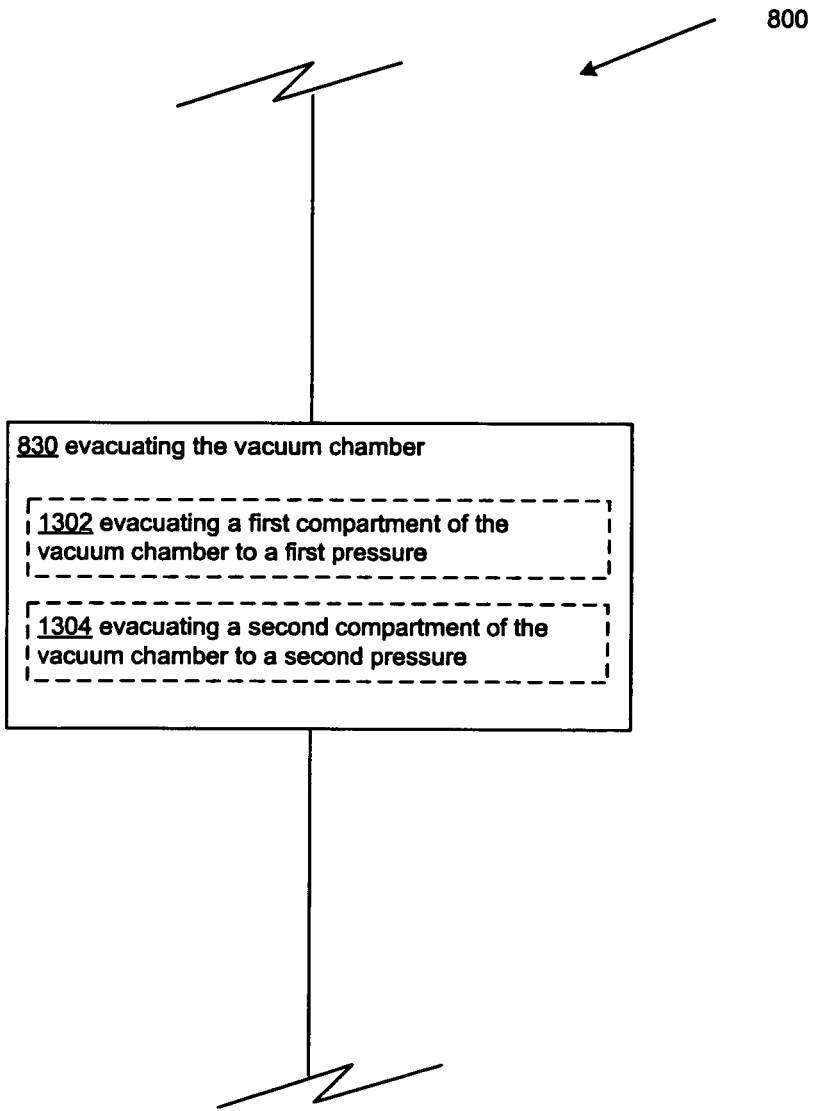
FIG. 13 is a high-level logic flowchart of a process depicting alternate implementations of FIG. 8.

FIG. 13 illustrates alternative embodiments of the example operational flow 800 of FIG. 8. FIG. 13 illustrates example embodiments where the evacuation operation 830 may include at least one additional operation. Additional operations may include an operation 1302, and/or an operation 1304.

At the operation 1302, evacuating a first portion of the vacuum chamber to a first pressure may occur. For example, as shown in FIGS. 1-7, the second compartment 122 may be evacuated via vacuum/pressurization port 114. The evacuation of the second compartment 122 may occur prior to closing the vacuum chamber lid 112 atop the vacuum chamber body 111 so as to maintain the flexible membrane 120 in close proximity to the vacuum chamber lid 112 and avoid contact between the flexible membrane 120 and at least one of the first substrate 101 and the second substrate 102 prior to pressure application operation 840.

At the operation 1304, evacuating a second portion of the vacuum chamber to a second pressure may occur. For example, as shown in FIGS. 1-7, the first compartment 121 may be evacuated via vacuum port 113. The evacuation of the first compartment 121 may occur after closing the vacuum chamber lid 112 atop the vacuum chamber body 111 so as to remove substantially all air from the interior of the first compartment 121. During evacuation operation 1304, a pressure differential may be maintained between the first compartment 121 and the second compartment 122 where the first pressure in the second compartment 122 is lower than the second pressure than the first compartment 121.

During evacuation operation 1304, a pressure differential may be maintained between the first compartment 121 and the second compartment 122 where the first pressure in the second compartment 122 is lower than the second pressure than the first compartment 121.

Figure 14:
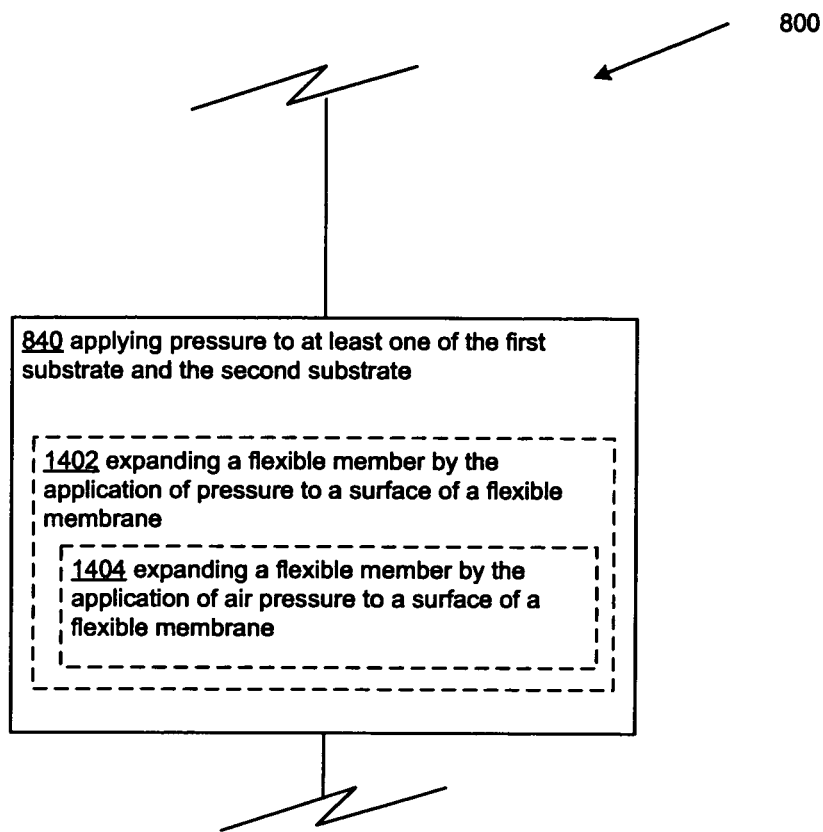
FIG. 14 is a high-level logic flowchart of a process depicting alternate implementations of FIG. 8.

FIG. 14 illustrates alternative embodiments of the example operational flow 800 of FIG. 8. FIG. 14 illustrates example embodiments where the pressure application operation 840 may include at least one additional operation. Additional operations may include an operation 1402, and/or an operation 1404.

At the operation 1402, expanding a flexible member by the application of pressure to a surface of the flexible mem may occur. For example, as shown in FIGS. 1 through 7, a pressure may be exerted on the surface of the flexible membrane 120 facing the second compartment 122. Further, at the operation 1404, expanding a flexible member by the application of air pressure to a surface of the flexible membrane may occur. For example, as shown in FIGS. 1 through 7, the vacuum/pressurization control logic 162 of the control unit 160 may cause the vacuum pump/compressor 180 to pressurize the second compartment 122 of the vacuum chamber 110 via the vacuum/pressurization port 114. Pressurization of the second compartment 122 may cause the flexible membrane 120 to expand, thereby contacting at least one of the first substrate 101 and the second substrate 102 and pressing the first substrate 101, the pressure-sensitive adhesive layer 103 and the second substrate 102 together to attach to the pressure-sensitive adhesive layer 103 and laminate the first substrate 101 to the second substrate 102.

In particular applications, a differential pressure between an evacuated first compartment 121 and a pressurized second compartment 122 of from about 20 to 7600 torr and, more particularly, about 760 torr may be desirable. However, the amount of pressure applied to the second compartment 122 and the corresponding expansion of the flexible membrane 120 may be a function of the pressure required to effectively attach a selected pressure-sensitive adhesive layer 103 or the sensitivity of the first substrate 101 and the second substrate 102, as would be determinable by one of skill in the art. As such, any range of differential pressures between the first compartment 121 and the second compartment 122 is fully contemplated by this disclosure.

Figure 15:
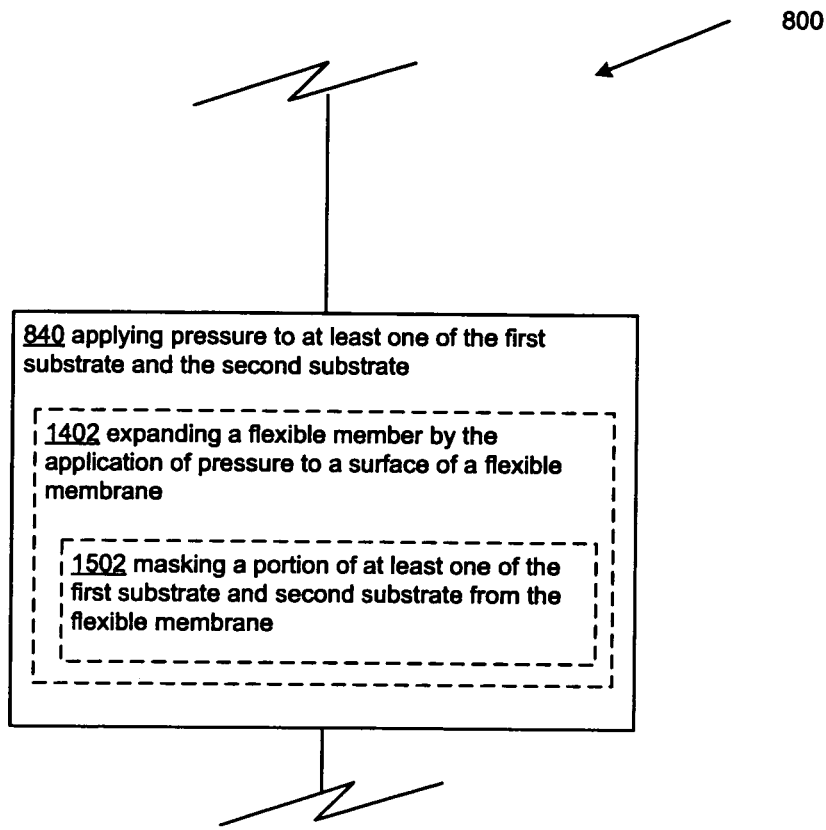
FIG. 15 is a high-level logic flowchart of a process depicting alternate implementations of FIG. 8.

FIG. 15 illustrates alternative embodiments of the example operational flow 800 of FIG. 8. FIG. 15 illustrates example embodiments where the pressure application operation 840 may include at least one additional operation. Additional operations may include an operation 1502. Further, at the operation 1502, masking a portion of at least one of the first substrate and second substrate from contact with the flexible membrane may occur. For example, as shown in FIGS. 1 through 7, the substrate mask 150 may be affixed to the substrate alignment insert 140 such that it provides a barrier between the flexible membrane 120 and at least one of the first substrate 101 and the second substrate 102. Such a configuration may limit the contact area of the flexible membrane 120 to particular portions of at least one of the first substrate 101 and the second substrate 102 within the area defined by the mask aperture 152 during flexible membrane 120 expansion.

Figure 16:
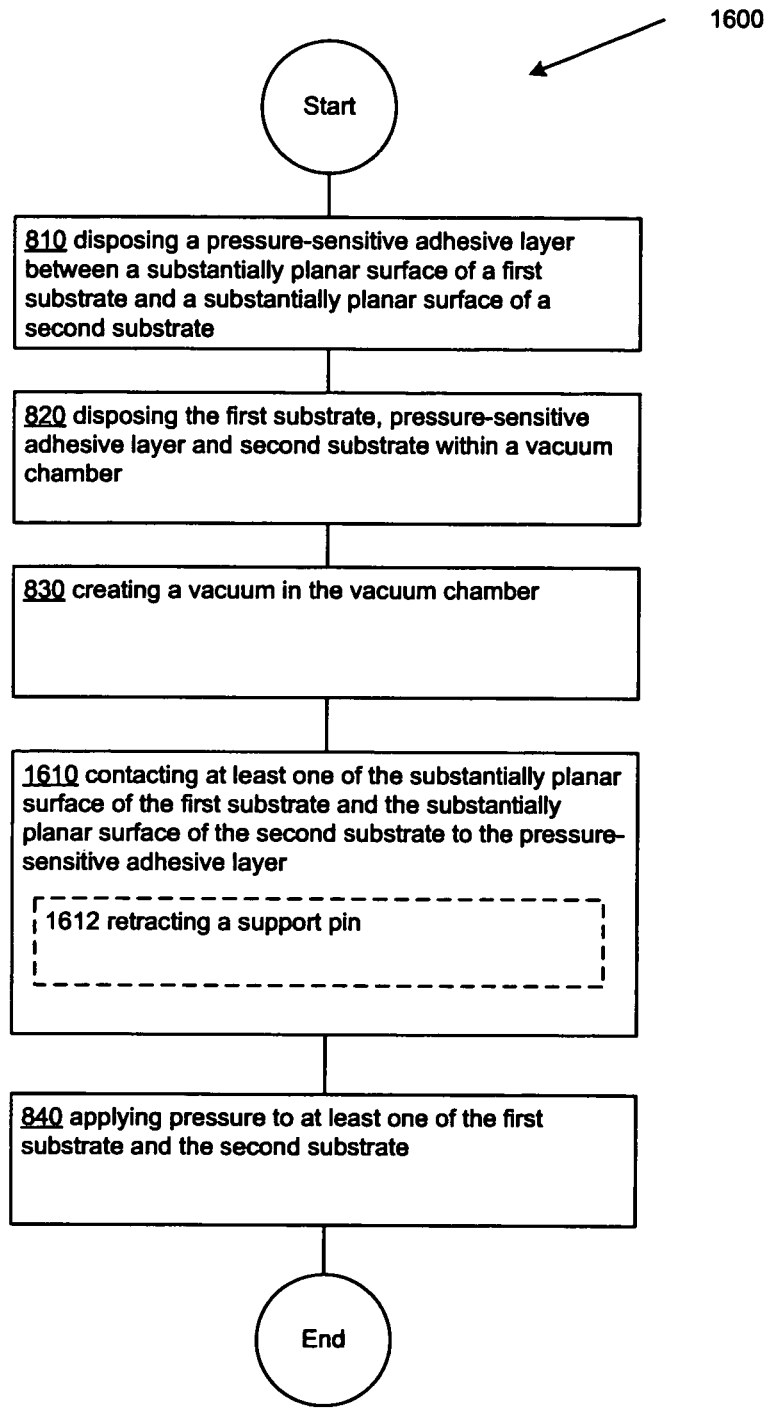
FIG. 16 is a high-level logic flowchart of a process.

FIG. 16 illustrates an operational flow 1600 representing example operations related to lamination of one or more substrates with a pressure sensitive adhesive. FIG. 16 illustrates an example embodiment where the example operational flow 800 of FIG. 8 may include at least one additional operation. Additional operations may include an operation 1610, and/or an operation 1612.

After a start operation, a disposing operation 810, a disposing operation 820, and a vacuum creation operation 830, the operational flow 1600 moves to a contacting operation 1610, where contacting at least one of the substantially planar surface of the first substrate and the substantially planar surface of the second substrate to the pressure-sensitive adhesive layer may occur. For example, as shown in FIGS. 1 through 7, at least one of the first substrate 101 and the second substrate 102 may be moved from a supported position where at least one of the first substrate 101 and the second substrate 102 is maintained in spatial separation from the pressure-sensitive adhesive layer 103 to a contacted position where at least one of the first substrate 101 and the second substrate 102 is brought into physical contact with the pressure-sensitive adhesive layer 103. Further, at the operation 1612, retracting a support pin may occur. For example, as shown in FIGS. 1 through 7, the retractable support pin 131 of the substrate support 130 which may support at least one of the first substrate 101 and the second substrate 102 in spatial separation from the pressure-sensitive adhesive layer 103 may be retracted so as to allow at least one of the first substrate 101 and the second substrate 102 to be brought into physical contact with the pressure-sensitive adhesive layer 103.

Figure 17:
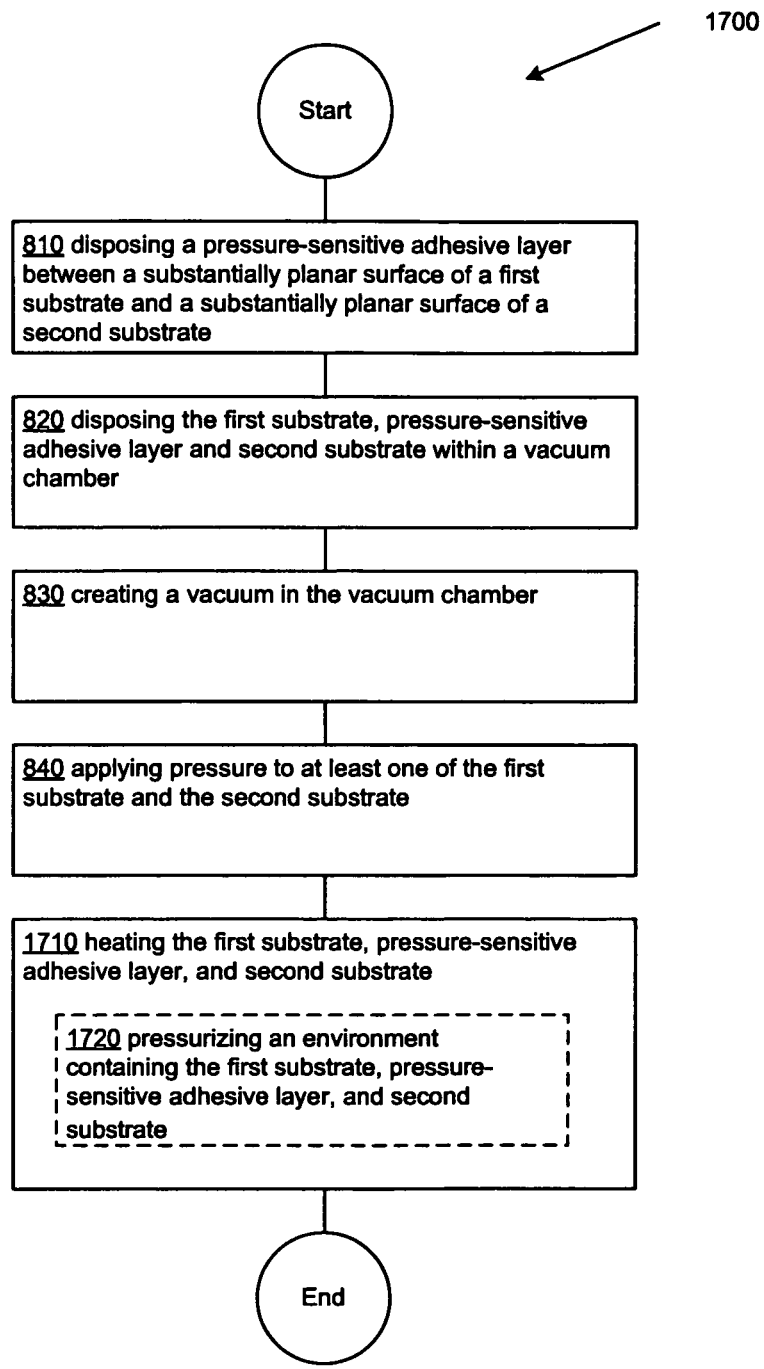
FIG. 17 is a high-level logic flowchart of a process.

FIG. 17 illustrates an operational flow 1700 representing example operations related to lamination of one or more substrates with a pressure sensitive adhesive. FIG. 16 illustrates an example embodiment where the example operational flow 800 of FIG. 8 may include at least one additional operation. Additional operations may include an operation 1710 and/or an operation 1720.

After a start operation, a disposing operation 810, a disposing operation 820, a vacuum creation operation 830, and a pressure application operation 840, the operational flow 1700 moves to a heating operation 1710, where heating the first substrate, pressure-sensitive adhesive layer, and second substrate may occur. For example, as shown in FIGS. 1 through 7, the first substrate 101, the second substrate 102 and the pressure-sensitive adhesive layer 103 may be heated by a heating element internal to the vacuum chamber 110 or disposed within an external heating apparatus, such as an autoclave. Such heating may serve to further set the pressure-sensitive adhesive layer 103. In particular applications, the heating may occur in an environment having a temperature of from about ambient to 200° C. and, more particularly, about 80° C.

Further, at operation 1720, pressurizing an environment containing the first substrate, pressure-sensitive adhesive layer, and second substrate may occur. For example, the first substrate 101, pressure-sensitive adhesive layer 103 and the second substrate 102 may be disposed in a pressure vessel in which the pressure may be elevated above ambient pressures. The elevated pressure may be from about 760 torr to about 7600 torr and, more particularly about 1520 torr.

Operations 1710 and 1720 may be conducted over a period of time of from about 2 to 5 hours. However, the amount of heat and pressure applied and the timing therefore may be a function of the heat and pressure required to effectively attach a selected pressure-sensitive adhesive layer 103 or the sensitivity of the first substrate 101 and the second substrate 102 to heat and/or pressure, as would be determinable by one of skill in the art. As such, any range of temperatures and pressures is fully contemplated by this disclosure.

It is believed that the lamination systems and methods and many of their attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

The invention claimed is:
1. A process for laminating substrates, the process comprising the steps:

disposing a pressure-sensitive adhesive layer between a substantially planar surface of a first rigid substrate and a substantially planar surface of a second rigid substrate;
  disposing the first substrate, pressure-sensitive adhesive layer and second substrate within a vacuum chamber;
  disposing a mask member within the vacuum chamber with the first and second substrates over at least a portion of one of the first substrate and the second substrate to prevent contact between the portion and a flexible member;
  evacuating the vacuum chamber;
  applying pressure to at least one of the first substrate and the second substrate by expanding the flexible member;
  wherein the first substrate comprises a display monitor.

2. The process of claim 1, wherein the disposing a pressure-sensitive adhesive layer between a substantially planar surface of a first rigid substrate and a substantially planar surface of a second rigid substrate further comprises:
  disposing a sheet of pressure-sensitive adhesive between a substantially planar surface of the first substrate and a substantially planar surface of the second substrate.

3. The process of claim 1, wherein the disposing a pressure-sensitive adhesive layer between a substantially planar surface of a first substrate and a substantially planar surface of a second substrate further comprises:
  coating at least one of the substantially planar surface of the first substrate or the substantially planar surface of the second substrate with a pressure-sensitive adhesive.

4. The process of claim 1, wherein the disposing the first substrate, pressure-sensitive adhesive layer and second substrate within a vacuum chamber further comprises:
  co-aligning a portion of the first substrate with a portion of the second substrate.

5. The process of claim 1, wherein the disposing the first substrate, pressure-sensitive adhesive layer and second substrate within a vacuum chamber further comprises:
  maintaining at least a portion of at least one of the first substrate and second substrate in spatial separation from the pressure-sensitive adhesive layer.

6. The process of claim 5, wherein the maintaining at least a portion of at least one of the first substrate and second substrate in spatial separation from the pressure-sensitive adhesive layer further comprises:
  supporting at least one of the first substrate and the second substrate on a support pin.

7. The process of claim 6, wherein the supporting at least one of the first substrate and the second substrate on a support pin further comprises:
  supporting the at least one of the first substrate and the second substrate on a retractable support pin.

8. The process of claim 5, wherein the maintaining at least a portion of at least one of the first substrate and second substrate in spatial separation from the pressure-sensitive adhesive layer further comprises:
  supporting at least one of the first substrate and the second substrate on a deformable support.

9. The process of claim 5, wherein the maintaining at least a portion of at least one of the first substrate and second substrate in spatial separation from the pressure-sensitive adhesive layer further comprises:
  supporting at least one of the first substrate and the second substrate on an electromagnetic support.

10. The process of claim 1, wherein the evacuating the vacuum chamber further comprises:
  evacuating a first portion of the vacuum chamber to a first pressure.

11. The process of claim 10, wherein the evacuating the vacuum chamber further comprises:
  evacuating a second portion of the vacuum chamber to a second pressure.

12. The process of claim 1, wherein the applying pressure to at least one of the first substrate and the second substrate further comprises:
  expanding the flexible member by the application of pressure to a surface of the flexible membrane.

13. The process of claim 12, wherein the expanding the flexible member by the application of pressure to a surface of the flexible membrane further comprises:
  expanding the flexible member by the application of air pressure to a surface of the flexible membrane.

14. The process of claim 1, further comprising:
  contacting at least one of the substantially planar surface of the first substrate and the substantially planar surface of the second substrate to the pressure-sensitive adhesive layer.

15. The process of claim 14, wherein the contacting at least one of the substantially planar surface of the first substrate and the substantially planar surface of the second substrate to the pressure-sensitive adhesive layer further comprises:
  retracting a support pin.

16. The process of claim 1, further comprising:
  heating at least one of the first substrate, pressure-sensitive adhesive layer, and second substrate.

17. The process of claim 16, further comprising:
  pressurizing an environment containing the first substrate, pressure-sensitive adhesive layer, and second substrate.

18. The process of claim 1, further comprising:
  inserting an alignment insert into the vacuum chamber, the alignment insert configured to align the first substrate with the second substrate; and
  supporting at least one of the first and second substrates with a support pin disposed in a vacuum chamber body, the vacuum chamber body forming at least part of the vacuum chamber; and
  wherein the alignment insert is removable from the vacuum chamber body and the support pin after applying pressure to at least one of the first substrate and the second substrate.

19. The process of claim 1, wherein applying a pressure to at least one of the first substrate and the second substrate by expanding the flexible member includes directing pressurized air through a diffuser screen to provide uniform airflow distribution within the vacuum chamber.

20. The process of claim 1, wherein the mask member defines a mask aperture.

21. The process of claim 20, wherein the mask member is supported on a substrate alignment guide.

22. A process comprising:
  disposing a pressure-sensitive adhesive layer between a substantially planar surface of a first rigid substrate and a substantially planar surface of a second rigid substrate, the first substrate comprising a display monitor;
  disposing the first substrate, pressure-sensitive adhesive layer and second substrate within an alignment insert, the alignment insert provided within a vacuum chamber body at least partially defining a vacuum chamber;
  disposing a mask member over at least a portion of one of the first substrate and the second substrate, the mask member configured to prevent contact between the portion and a flexible member;
  supporting at least one of the first and second substrates within the vacuum chamber with a support pin disposed in the vacuum chamber body;

evacuating the vacuum chamber;
applying pressure to at least one of the first substrate and the second substrate;
wherein the alignment insert is removable from the vacuum chamber body and the support pin.

23. The process of claim 22, wherein applying pressure to at least one of the first substrate and the second substrate comprises applying pressure to the first substrate via a first flexible membrane and applying pressure to the second substrate via a second flexible membrane.

24. The process of claim 23, further comprising supporting the first and second substrates in a vertical orientation as pressure is applied by the first and second flexible membranes.

25. The process of claim 22, wherein the alignment insert comprises a generally planar member.

26. The process of claim 22, further comprising retracting the support pin using a computer control unit prior to applying pressure to at least one of the first substrate and the second substrate; and
removing the alignment insert after applying pressure to at least one of the first substrate and the second substrate.

\* \* \* \* \*